United States Patent [19]

Swanquist

[11] 3,730,466
[45] May 1, 1973

[54] DEVICE FOR ATTACHING ELECTRICAL BOXES TO METAL STUDDING

[75] Inventor: Wesley W. Swanquist, Oswego, Ill.

[73] Assignee: All-Steel Equipment Inc., Aurora, Ill.

[22] Filed: Dec. 8, 1971

[21] Appl. No.: 206,102

Related U.S. Application Data

[60] Division of Ser. No. 38,319, May 18, 1970, Pat. No. 3,684,230, which is a continuation-in-part of Ser. No. 771,408, Oct. 29, 1968, abandoned.

[52] U.S. Cl. ..................248/216, 220/3.9, 248/229, 248/DIG. 6, 52/714
[51] Int. Cl. .............................................H02g 3/08
[58] Field of Search..................248/216, 220.5, 228, 248/229, 71, DIG. 6; 220/3.9; 52/714

[56] References Cited

UNITED STATES PATENTS

| | | | |
|---|---|---|---|
| 927,367 | 7/1909 | Marshall | 248/216 |
| 1,794,817 | 3/1931 | Zitko | 248/71 |
| 1,828,064 | 10/1931 | Paine | 248/DIG. 6 |
| 1,910,231 | 5/1933 | Barnett | 248/DIG. 6 |
| 2,342,965 | 2/1944 | Palmer | 248/DIG. 6 |
| 2,459,953 | 1/1949 | Mills | 248/DIG. 6 |
| 3,097,821 | 7/1963 | Richards | 248/216 |
| 3,428,284 | 2/1969 | Trachenberg et al. | 248/216 |

FOREIGN PATENTS OR APPLICATIONS

| | | | |
|---|---|---|---|
| 654,411 | 12/1937 | Germany | 52/714 |
| 1,050,515 | 2/1959 | Germany | 248/216 |

Primary Examiner—Marion Parsons, Jr.
Attorney—Mann, Brown, McWilliams & Bradway

[57] ABSTRACT

The disclosure relates to a device for attaching switch boxes and the like to metal studding, for use on studding of the channel and stressed wire types, which is in the form of a mounting device including a clip portion in which the box is secured and a stud engaging portion that includes a planar flange defining an abutment portion adjacent its projecting end that is adapted to engage against one of two opposite surfaces of the stud, with the flange carrying a pair of spring arms that project outwardly therefrom and diverge outwardly thereof that each include a finger engaging portion at the projecting end thereof and an abutment forming toothed projection at right angles thereto that are spring biased against the other surface of the stud to clamp the stud portion bearing such surfaces between the flange abutment portion and the abutment forming projections. An alternate form of the device is disclosed that is arranged specifically for use on nailable steel studding.

2 Claims, 17 Drawing Figures

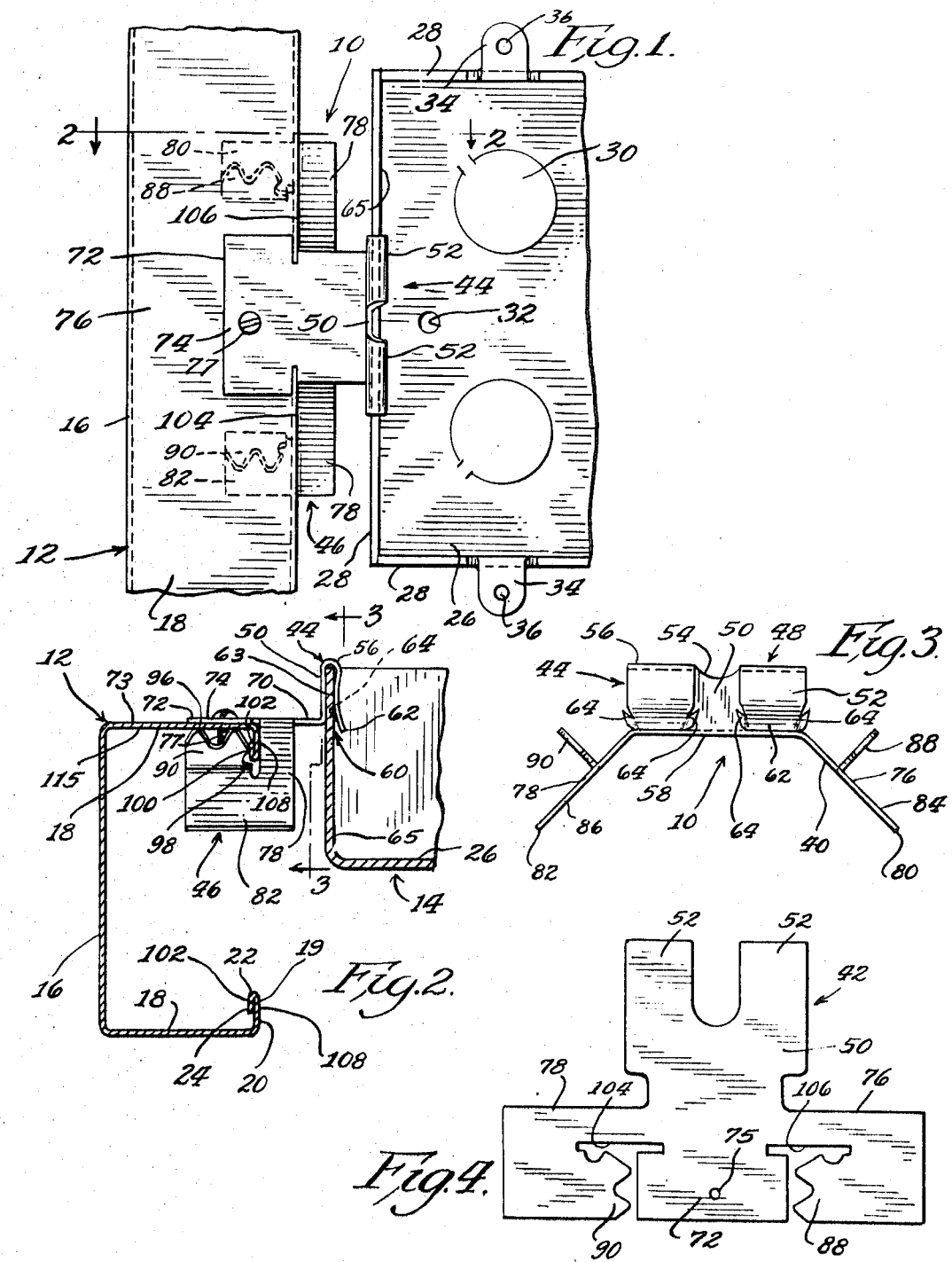

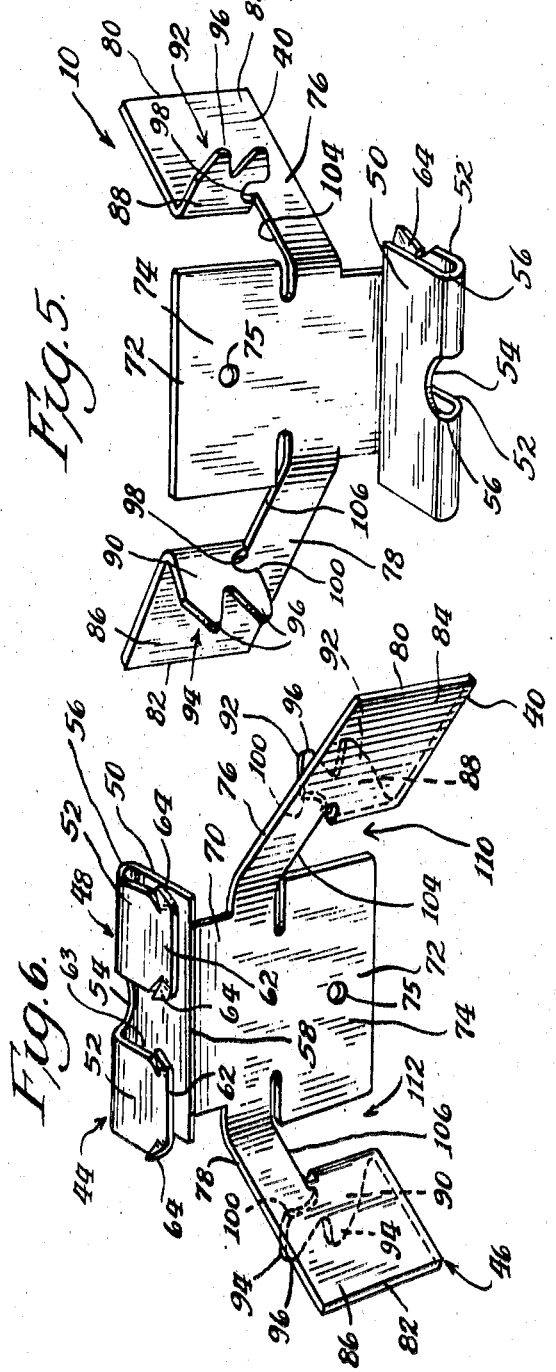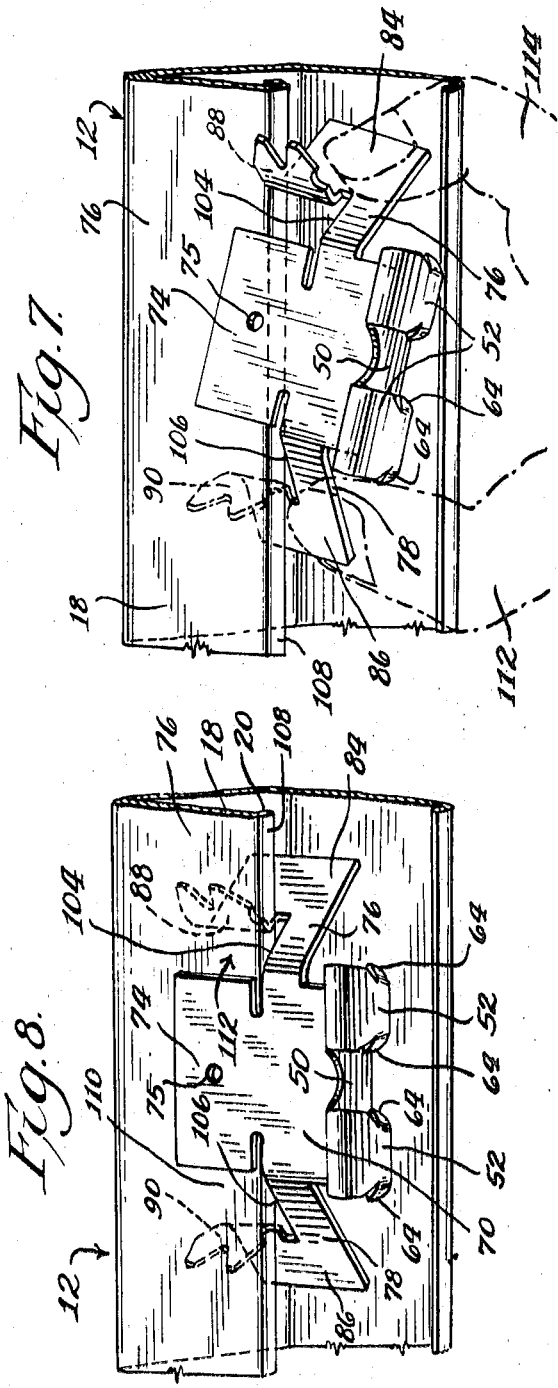

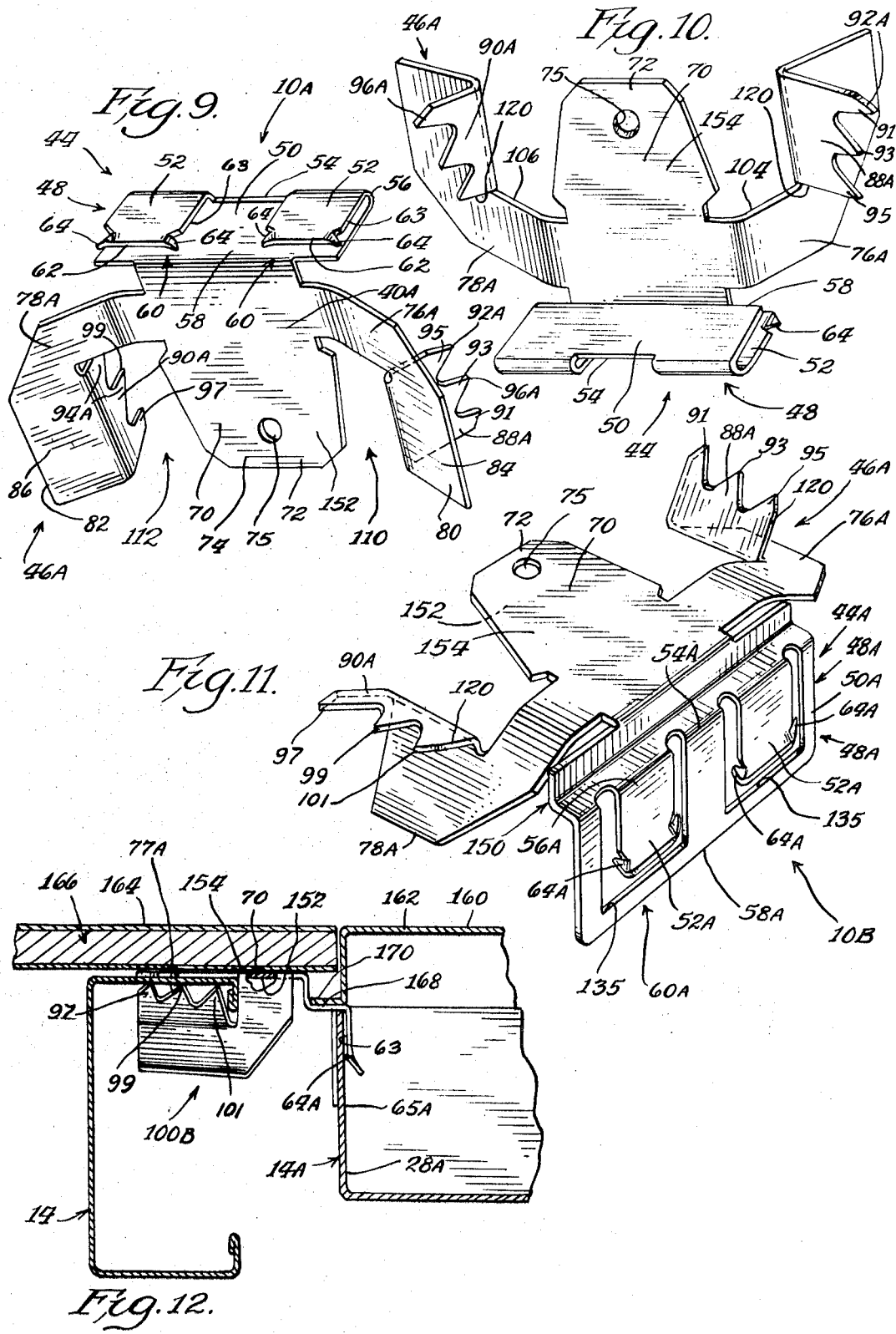

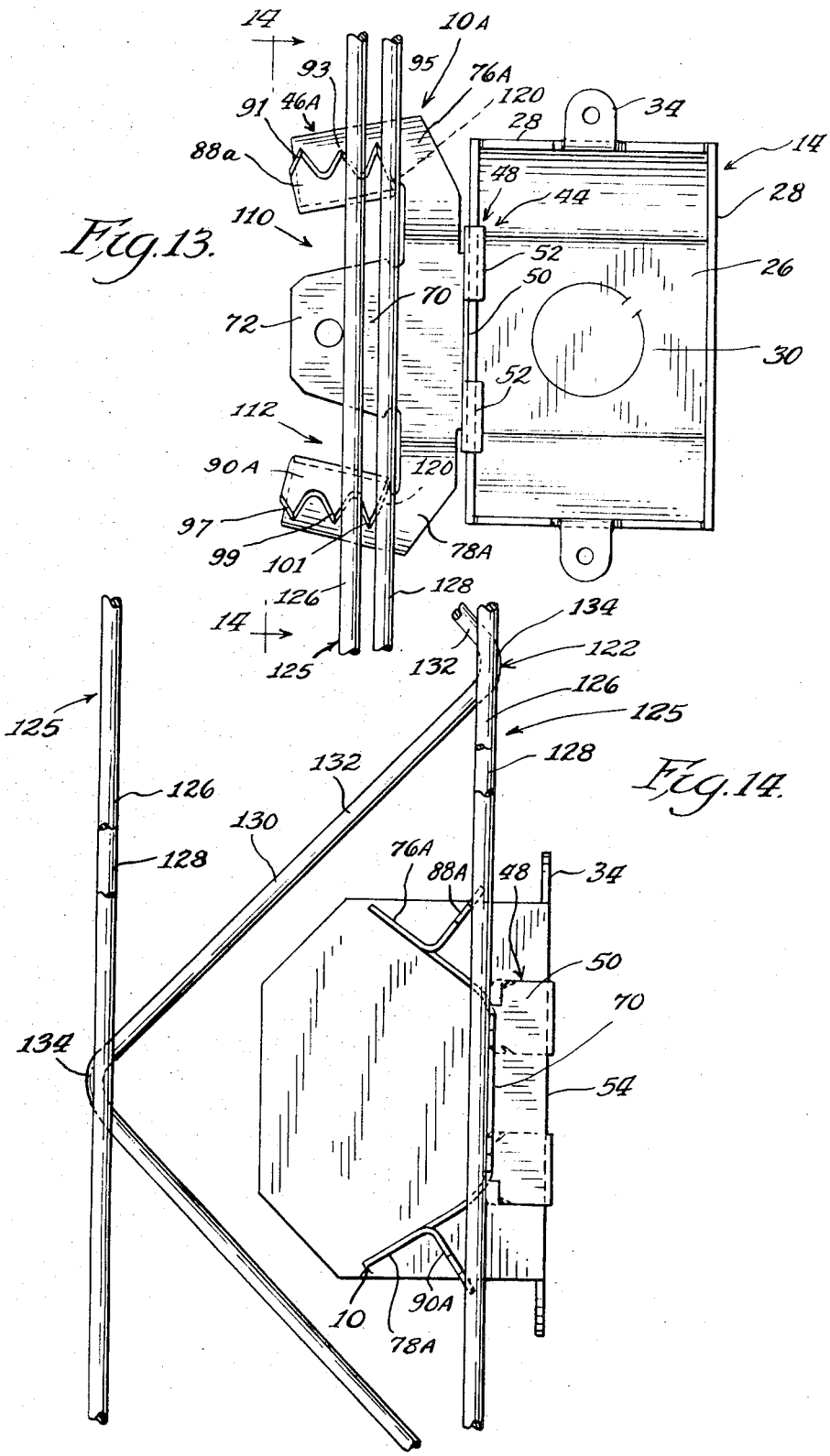

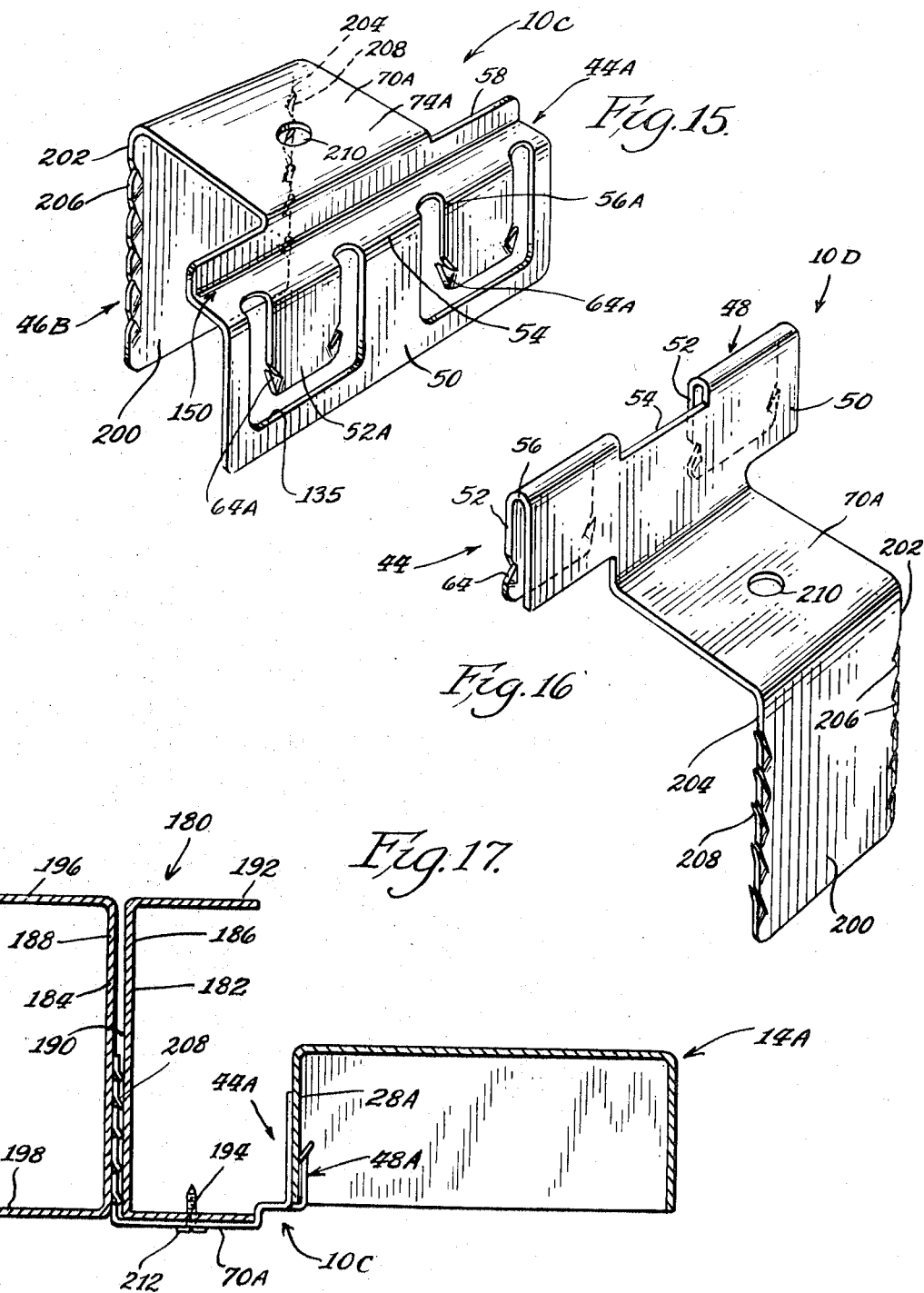

DEVICE FOR ATTACHING ELECTRICAL BOXES TO METAL STUDDING

This application is a division of my application Ser. No. 38,319, filed May 18, 1970 (now U.S. Pat. No. 3,684,230), which was a continuation-in-part of my abandoned application Ser. No. 771,408, filed Oct. 29, 1968.

My invention relates to a device especially arranged to permit the securement of switch and outlet boxes and the like to various forms of metal studding which are now widely used in commercial and residential construction in connection with dry wall construction.

While quite a number of devices have now been devised to mount switch and outlet boxes and the like on metal studding, there remains a significant need for a simple one-piece device that can be readily secured to both the switch and outlet boxes and to the various types of metal studding without requiring the use of hand tools or the like.

The principal object of this invention is to provide a device for securely mounting electrical switch and outlet boxes and the like on metal studding in a facile manner and without requiring the drilling of holes or the like or even using hand tools.

Another object of the invention is to provide an electrical box mounting device that is specifically not only applicable to metal channel studding, and is arranged to take advantage of the particular shape of such studding in applying and securing the box thereto, but which also can be employed to mount boxes on stressed wire studding.

Still another object of the invention is to provide an electrical box mounting device that is specifically applicable to nailable steel studding, and is arranged to take advantage of the particular shape of such studding in applying and securing the box thereto.

In accordance with this invention, a device for mounting switch boxes or the like is provided in the form of a box engaging portion for securing the box thereto and a stud engaging portion for securing the mounting device to the stud. The box engaging portion comprises a clip device including a planar base and one or more clamping legs into which the side wall of the box is pressed for securing the box to the device with one form of clip device providing the familiar flush mount for outlet boxes, and another form of the clip device providing the familiar projected mount for switch boxes. The mounting device stud engaging portion includes a flange integral with the clip device and defining an abutment portion adjacent its projecting end for engagement with, in connection with channel studding, the outer surface of one of the stud side walls. The flange carries a pair of spring arms that diverge diagonally from the flange and define finger grip portions at their projecting ends, and a pair of toothed abutment forming projections that are perpendicular to the respective arms and project toward the plane of said flange. Finger manipulation by the operator of the finger grip portion of the spring arms permits such arms to be deflected so that the spring arm projections may be both maneuvered around the stud side wall inturned flange and placed in engagement with the inside surface of the stud side wall whereupon the resiliency that is built into the spring arms clamps the stud side wall between the flange abutment portion and the spring arm projections to secure the mounting device to the stud. The spring arm projections define several pairs of oppositely acting sharp edges that bite into the stud and oppose movement of same longitudinally of the stud.

In one form of the invention, the stud engaging portion is arranged to engage both channel studding and stressed wire studding. In another form of the invention the stud engaging portion is arranged for application to nailable steel studding.

Other objects of the invention are to provide a device for applying electrical boxes to metal channel and stressed wire studding which provides for firm securement of the box to the stud, yet which permits ready adjustment longitudinally of the stud after being applied thereto by a simple finger manipulation procedure, which meets all Underwriter Laboratory specifications, and which is economical of manufacture, convenient to use, and adapted for wide application.

Still other objects, uses and advantages will be obvious or become apparent from a consideration of the following detailed description and the application drawings, in which like reference numerals indicate like parts throughout the several views.

In the drawings:

FIG. 1 is a side elevational view of a metal channel stud having the invention applied thereto to mount a switch box on the stud;

FIG. 2 is a sectional view substantially along line 2—2 of FIG. 1, showing the mounting device in end elevation;

FIG. 3 is a plan view of the mounting device itself;

FIG. 4 is a plan view of the stamping from which the mounting device is formed;

FIGS. 5 and 6 are perspective views taken from either side of the mounting device, showing the details thereof;

FIGS. 7 and 8 are perspective views illustrating the manner in which the mounting device of FIGS. 1 - 6 is applied to a metal channel stud (the box that is to be mounted on the stud being omitted to facilitate illustration);

FIGS. 9 and 10 are views similar to those of FIGS. 5 and 6, illustrating a modified form of the device in which the stud engaging portion is applicable to either channel studding or stressed wire studding;

FIG. 11 is a perspective view of another form of the device having the stud engaging portion of FIGS. 8 and 9 and a box engaging portion arranged for flush mounting of the box;

FIG. 12 is a view similar to that of FIG. 2 showing the embodiment of FIG. 10 in use to mount an outlet box on a channel stud;

FIG. 13 is a view similar to that of FIG. 1, showing the form of FIGS. 8 and 9 employed to mount a switch box on stressed wire studding;

FIG. 14 is a view substantially along line 14—14 of FIG. 13;

FIG. 15 is a perspective view of another embodiment of the invention for mounting electrical boxes on nailable steel studding and being arranged to provide a flush mount;

FIG. 16 is a view of the form of the invention shown in FIG. 14 arranged to mount switch boxes; and FIG. 17 is a view similar to that of FIGS. 2 and 11 showing the device of FIG. 15 applied to nailable steel studding to mount an outlet box.

However, it is to be understood that the specific drawing illustrations provided are supplied primarily to comply with the requirements of the Patent Code, and that the invention may have other specific embodiments that are intended to be covered by the appended claims.

GENERAL DESCRIPTION

Reference numeral 10 of FIG. 1 generally indicates one embodiment of the invention applied to metal channel type stud 12 for the purpose of securing in place the conventional switch box 14.

As indicated in FIG. 2, the stud 12 is of the type having the familiar generally channel-shaped configuration comprising a back wall or web 16 flanked by side walls 18, the free ends 19 of which are inturned to form opposed inturned flanges 20; the ends 19 are rolled or folded back on themselves as at 22 to define a bead 24.

The box 14 that is specifically illustrated is intended to be representative of those used in commercial and residential construction, and comprises a bottom wall 26 and side walls 28. As is customary with such devices, the bottom wall 26 and side walls 28 are formed with a plurality of knock-outs 30 and perforations or holes 32 adapted to receive screws or nails or other types of fasteners for fixing the box in place. Two of the opposed side walls 28 include a wing or ear 34 that is formed with a threaded hole as at 36 to receive the screw for applying the switch or the like to the box. Boxes such as box 14 house electrical equipment and, as is well-known by those working in this field, boxes of this type may take a variety of shapes and forms for different purposes, but box 14 is in this instance a switch box.

Device 10 comprises a one-piece element 40 formed out of the stamping 42 indicated in FIG. 4 to define a box mounting portion 44 and a stud mounting portion 46 that are integrally united to form the one-piece element 40 that is best illustrated in the perspective views of FIGS. 5 and 6, and is specifically arranged to mount switch boxes, which ordinarily are to be positioned so that their open side projects forwardly of the stud so that their covers, which are usually flat, will be flush with the wallboard employed.

The box mounting portion 44 of device 10 generally comprises a clip defining structure 48 including a planar generally quadrilateral base portion 50 provided with one or more clamping legs 52 (two in the embodiment illustrated) extending from edge 54 of base 50 and arced as at 56 to extend over the base 50 toward the edge 58 thereof, where they define an open mouth 60 of the clip structure 48.

The clamping legs 52 are resilient in nature, and are shaped and spaced from the base portion 50 to resiliently grip a side wall 28 of the box 14 when the same is inserted between the base and the legs in the manner indicated in FIGS. 1 and 2. As indicated in FIG. 2, legs 52 are preferably concavely curved longitudinally thereof to define terminal portions 62 that are spaced from base 50 to readily admit the box side wall into mouth 60, and wall engaging portions 63 that physically engage the box wall in clamping relationship thereto. As device 10 is to mount switch box 14 on stud 12, the base portion 50 and clamping legs 52 are arranged to dispose the open side of the box forwardly or outwardly of the channel side wall 18 against which the wallboard will seat (which is the upper wall 18 in the showing of FIG. 2).

The box mounting portion of legs 52 have formed at either side thereof in their respective portions 63 a downwardly angled barb 64 which barb is directed inwardly of mouth 60 and, after insertion of the box side wall within or under legs 52, bites into the inner surface 65 of the box side wall and opposes withdrawal of the box side wall from the clip structure 48.

The stud mounting portion 46 of device 10 generally comprises a flange 70 extending from the box mounting portion base 50 and at right angles thereto along its edge 58, which is shaped to define at its projecting end 72 a planar abutment portion 74 that is adapted to be placed into abutting relation with the external surface 73 of one of the channel side walls 18 (see FIG. 2). Abutment portion 74 is preferably perforated as at 75 to receive a suitable self tapping screw 77 (see FIG. 1) that may be flat headed to avoid interference with the wallboard.

The flange 70 also carries on either side thereof a pair of diverging spring arms 76 and 78 that lie in a plane paralleling the plane of the base 50 and diverge outwardly of the clip structure mouth 60. As indicated in FIG. 3, the arms 76 and 78 are angled at approximately 45 degrees with respect to the plane of flange 70 and thus are diagonally related thereto.

The arms 76 and 78 are each formed to define at their projecting ends 80 and 82, respectively, finger engaging portions 84 and 86, respectively, which are intended to be engaged by the operator's fingers in the manner suggested in FIG. 7 in applying the device 10 to a stud.

Arms 76 and 78 each include an abutment forming projection 88 and 90, respectively, with the projections 88 and 90 being respectively perpendicularly disposed with respect to the respective arms 76 and 78, and projecting in the direction of the plane of the flange 70. The projections 88 and 90 are each formed with a toothed configuration where indicated at 92 and 94, respectively, which may involve one or more teeth of the general type indicated.

The parts of the device 10 are respectively proportioned so that in the unstressed position of the arms 76 and 78, the terminal portions 96 of the respective abutment forming projections 88 and 90 lie within or closely adjacent to the plane of the flange 70 so that when the device 10 is applied to the stud 12 in the manner about to be described, the side wall 18 of the stud that is involved will be clamped between the flange abutment portion 74 and the spring arm projections 88 and 90.

The spring arm projections 88 and 90, in the form shown in FIGS. 1 - 8 are notched as indicated at 98 to define a sharp edge shoulder 100 that in the mounted position of the device 10 bites into the undersurface 102 of the channel bead 24. The notch 98 and its shoulder 100 are considered optional features, however, and may be omitted, in which case the edge 99 of the respective projections 88 and 90 is suitably shaped to avoid engagement with the channel bead 24 when device 10 is applied to the stud.

As is indicated in FIGS. 5 and 6, the arms 76 and 78 each define planar edge surfaces 104 and 106, respectively, that are in coplanar relation and lie in a plane that is parallel to the plane of the base 90. In the mounted position of the device 10, the surfaces 104 and 106 engage the outer surface 108 of the stud bead 24.

As is also indicated in FIGS. 5 and 6, the device 10 between the projections 88 and 90 is formed to define notches or openings 110 and 112 in which the side wall 18 of the stud, to which the device 10 is applied, is disposed as part of the procedure of applying the device 10 to the stud.

Referring now to FIGS. 7 and 8, the device 10 is applied to the stud 12 by the installer grasping the device 10 by employing his thumb 113 and a finger 114 (usually the middle finger) of one hand (the right hand in the showing of FIG. 7) to grip the finger grip portions 84 and 86, and canting the device 10 with respect to the channel 12 to dispose the finger gripping portion 86 of arm 78 and the latter's projection 90 between the stud inturned flanges 20, and the finger gripping portion 84 of the arm 76 outside of the stud side wall 18 to which the device 10 is to be applied (the near side wall 18 in the showing of FIGS. 7 and 8), with the device 10 being positioned relative to the stud to bring the surface 106 of the arm 78 into abutting relation with the inturned flange outer surface 108.

The installer may then press finger grip portion 84 of arm 76 toward finger grip portion 86 of arm 78 to swing the finger grip portion 84 and projection 88 of arm 76 inwardly of the inturned flange 20 (of the wall to which the device is being applied), whereupon the device 10 may be swung downwardly using the engagement between same and the stud 12 at surface 106 as a fulcrum to dispose the projection 88 below the level of bead 24 and bring surface 104 into engagement with the surface 108, whereupon the finger grip portions of the device may be released to permit the natural resiliency of the material from which it is made to bias the projections 88 and 90 against the inner surface 115 of the stud side wall 18 and thus clamp the stud side wall in question between the flange abutment portion 74 and the projections 88 and 90 of spring arms 76 and 78.

This action also brings the shoulders 100 (where employed) into biting relation with the inner surface 102 of the bead 24 of the stud side wall to which the device 10 is applied.

As the abutment forming projections 88 and 90 are angled away from each other and the flange 70, they tend to bite into the stud side wall and oppose movement of device 10 in either direction longitudinally of the stud. Shoulders 100, which are spaced below the plane of surfaces 104 and 106 an amount to insure a biting relation to the bead 24, in having the same angulation with respect to the stud side wall that the respective projections 88 and 90 do, likewise oppose movement of the device 10 in either direction in a similar manner.

The device 10 may be readily shifted longitudinally of the stud 12 by the operator merely grasping the finger grip portions 84 and 86 of the respective springs arms 76 and 78 in the manner indicated in FIG. 7 and biasing them towards each other to release the engagement of the projections 88 and 90 and their respective shoulders 100 with the stud side wall; when the device 10 is positioned as desired to dispose the box in its predetermined location, the arms 76 and 78 are released to firmly mount the device 10 in its operative position.

The box 12 is applied to the clip structure 48 of the device 10 by inserting a selected side wall 28 of the box within the clip portion approximately to the position indicated in FIG. 2. The resilient action of the clamp legs 52 and their barbs 64 firmly hold the box in place and oppose withdrawal of same from the clip structure 48. The box may be applied to device 10 either before or after the clip device has been applied to the stud.

Minor positioning adjustments longitudinally of the stud, after the box is applied to the stud, can readily be made by reaching behind the box to grasp the finger grip portions 84 and 86 in the manner indicated to release the hold that projections 88 and 90 have on the stud side wall and shifting the box and device 10 as a unit to the position desired. Suitable self tapping screw 77 or the like is then applied to the stud through hole 75 of device 10 to permanently fix device 10 in place on the stud.

In the specific embodiment of FIGS. 1 – 8, the device 10 is made from 22 gauge C–1050 steel by a suitable stamping operation to form the stamping 42 of FIG. 4 and suitable subsequent forming operations to give the device 10 the configuration illustrated in FIGS. 5 and 6. The material from which the device 10 is formed is suitably heat treated and drawn to a number 44 Rockwell-C. The stamping 42 is conveniently formed from a 2¼ inch by 3½ inch size blank of the material indicated.

Referring now to the embodiment of FIGS. 9 and 10, the box mounting device 10A comprises the box mounting portion 44 of the embodiment of FIGS. 1 – 8, and a stud mounting portion 46A which is modified insofar as the projections 88A and 90A are concerned to eliminate the notches or openings 110 and 112 of the device 10 and to form the edge surface 120 of each of the respective projections 88A and 90A to incline in a diagonal manner away from the plane of the base portion 50, so that the device 10A can be applied to conventional stressed wire studding 122 as well as studding 12 of the channel shaped type shown in FIGS. 1, 2, 7 and 8.

Referring to FIGS. 13 and 14, which illustrate one specific form of stressed wire studding 122, it will be seen that studding 122 comprises spaced pairs 125 of side wires 126 and 128, are disposed in parallel relation, with the wires 126 of each pair 125 spaced apart (see FIG. 13) to receive between them a reinforcing wire 130 that is formed to define diagonally disposed lengths 132 extending between the respective pairs 125 and fixed to same as by welding the rods 126 and 128 to the rod 130 at its corners 134. Studding of this type is available in various sizes and that illustrated is intended to be representative of studding of this type.

The device 10A is applied to the stressed wire studding 24 in a manner similar to that described in connection with the showing of FIGS. 7 and 8, with the rods 126 and 128 of a pair of side rods 125 as a group being positioned in the sotches or openings 110 and 112 of the stud mounting portion 46A, and with the teeth 95 and 101 of the respective spring arms 76A and 78A received between the two side rods 126 and 128 that are involved, as indicated in FIG. 13. The tapered nature of the teeth of the respective spring arm projections 88A and 90A, including the tapered edges 120 of the respective teeth 95 and 101, effect a centering action of the teeth 95 and 101 with respect to the rods 126 of the stud side rod pair 125 to which the device 10A is attached.

The device 10A is equally applicable to stud 12 by following the procedure described in connection with FIGS. 7 and 8. In this connection, the action of the installer in pressing on the finger grip portions 84 and 86 of device 10A tends to twist the respective spring arms 76A and 78A about the longitudinal axes of the respective arms 76A and 78A. In order to insure that the tips of the teeth 91, 93, 95, 97, 99 and 100 are all disposed so that when the device 10 is applied to the stud 12, the tips of all six teeth engage the side wall 18 of the stud, the teeth of the respective projections 88A and 90A project from the planes of the respective finger grip portions 84 and 86 in successively greater amounts, as indicated in FIG. 10. Thus, teeth 95, 93, and 91 of projection 88A project in successively increasing amounts from the plane of finger grip portion 84, and the teeth of projection 90A are similarly arranged.

The box mounting device 10B generally comprises the stud mounting portion 46A of the embodiment of FIGS. 9 and 10 and a modified box mounting portion 44A which comprises a clip defining structure 48A that includes a generally planar quadrilateral base portion 50A provided with one or more clamping legs 52A (two in the form illustrated) extending from the edge 54A of the base 50A and arced as at 56A to extend over the base 50A toward the edge 58A thereof, where they define an open mouth 60A of the clip structure 48A.

As was the case in the embodiment of FIGS. 1 - 10, the clamping legs 52A are resilient in nature, and are shaped and spaced from the base portion 50A to resiliently grip a side wall of the box to be mounted by the mounting device 10B, though in device 10B, legs 52A are formed by being stamped from part of base portion 50A, leaving the respective openings 135 in base 50A.

In the case of the mounting device 10B, the box mounting portion is shaped to provide the so-called "-flush mount" that is customarily employed for outlet boxes 14A (see FIG. 12), as distinguished from the projection mount for switch box 14, and thus the clamping legs 52A are to resiliently grip a side wall 28A of the outlet box 14A when the latter is inserted between the base 50A and the legs 52 in the manner indicated in FIG. 12.

In accordance with this invention, the box mounting portion 44A is shaped to define a shoulder 150 and dispose the base 50A and its clamping arms 52A in overlying relation to the plane of the arms 76A and 78A of the stud mounting portion 46A, as distinguished from the embodiments of FIGS. 1 - 10, wherein the box mounting portion projects to the other side of the box mounting device. Thus, in the embodiment of FIG. 11, the box mounting portion 44A extends or projects from the side 152 of the stud mounting flange 70, while in the embodiments of FIGS. 1 - 10, the box mounting portion extends or projects from the other side 154 of the flange 70.

As seen in FIG. 12, the mounting device 10B disposes the outlet box 14A, when the device 10B has been applied to the stud 14 in such a manner that when the cover 160 of the box 14A is applied thereto, its outwardly facing surface 162 will be more or less flush with the outwardly facing surface 164 of wallboard 166. The shoulder 150 of the box mounting portion 44A defines an internal shoulder 168 in which the flange 170 of the box cover 160 is received, the box cover 160 being secured to the box 14A by suitable screws in the usual conventional manner.

The box mounting device 10B can also be applied to the stressed wire studding 122 in the manner indicated in FIGS. 13 and 14 to flush mount box 14A with respect thereto.

It may be pointed out that clip device 10B may be secured in place by appropriate flat headed screws 77A to permanently fix device 10B in place. It is also pointed out that in connection with the showing of FIG. 2, wallboard is conventionally applied across the stud 12 up to the base 50 of box mounting portion 44 of device 10, with the cover that is applied to box 14 ordinarily having its outer surface substantially in alignment with the outwardly facing surface of the wallboard (not shown).

In the embodiment 100 of FIGS. 15 and 17, the mounting device is adapted for application to nailable steel studding of the type shown in FIG. 17, which generally speaking comprises a pair of channel members 182 and 184 secured together in back to back relation with their webs 186 and 188 spot welded or otherwise fixed together at spaced points therealong. Between the points of securement together there is thus left between the webs 186 and 188 a mounting opening or slot 190 (which is over emphasized in the showing of FIG. 17 for clarity) to which screws or rink shank serrated nails are applied to mount things. As is conventional, the channel studding member 182 includes spaced flanges 192 and 194 integrally connected with its web 186, while the channel member 184 includes flanges 196 and 198 integrally connected to its web portion 188.

The box mounting device 10C of FIGS. 15 and 17 comprises the box mounting portion 44A of the embodiment of FIGS. 11 and 12 and a modified stud mounting portion 46B comprising a flange 70A extending from the box mounting portion base 50A and at right angles thereto. Flange 70A defines a planar abutment portion 74A and integrally connected to the flange 70A is a driving arm or peg portion 200 that is substantially planar in configuration and that is at right angles to the flange 70A. The side edges 202 and 204 are each formed with a plurality of teeth 206 and 208, respectively, which are angled to prevent withdrawal of the arm or peg portion 200 when it has been inserted in the slot 190 of the nailable steel studding 180.

In use, the box 14 is applied to the box mounting portion 44A of device 10C in the manner described in connection with the embodiment of FIG. 11, and the driving arm or peg 200 of the flange 70 is driven into the slot 190 from the side of the nailable steel studding 180 on which the box is to face. The arm or flange 200 is driven into the slot 220 until the flange 70A abuts against the adjacent stud channel flange 194 or its equivalent, depending on which side of the nailable steel studding the device 10C is applied to.

Flange 70A is formed with a suitable perforation 210 to receive a suitable screw 212 to fix the device 10C in mounted position.

The box mounting device 10D of FIG. 16 employs the box mounting portion 44 of the embodiments of FIGS. 1 – 8 instead of the box mounting portion 44A, but is otherwise the same as the embodiment of FIGS. 15 and 17, as indicated by corresponding reference numerals, and is employed in like manner to mount switch boxes on studding 180.

In the embodiments of FIGS. 15 – 17, the serrations 206 and 208 are shown angled from the same side of the arm 200, but this is for simplification of manufacturing procedures only as the serrations could be angled from either side of the arm 200, or could be alternately angled, as desired.

The box mounting devices 10, 10A, 10B, 10C and 10D thus provide a family of box mounting devices which permit the mounting of electrical boxes to three of the basic types of metal studding commonly employed in construction today. The box mounting portion 44 may be employed to mount switch boxes, which are ordinarily projection mounted, while the box mounting portion 44A may be employed to mount outlet boxes, which are ordinarily flush mounted.

It will therefore be seen that this invention has provided a novel and useful device for mounting electrical boxes to metal studding which requires at the most only the simplest of hand tools, and which provides, in combination with the stud and the box, a secure mounting arrangement for the box.

The terms "box" or "electrical box" as used herein and in the appended claims means switch, outlet and other electrical boxes unless otherwise indicated.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A mounting arrangement for securing an electrical box or the like to nailable steel studding of the type comprising a pair of channel elements fixed together back to back and defining a slot therebetween, said mounting arrangement comprising in combination with the studding:

a mounting device comprising:

a clip portion defining a base having a clamping leg extending from one edge thereof and above said base on one side thereof to define the clip portion mouth along the other edge of said base, said leg and base being formed to frictionally grip the side wall of an electrical box introduced between same to secure the box to said device, and a stud engaging portion comprising:

a flange projecting from the other side of said base substantially at right angles thereto and extending transversely of said leg, said flange carrying an arm disposed normally thereof and proportioned to be frictionally driven in the studding slot, with said flange arm being driven into said slot to dispose said flange into abutting relation with a side wall of one of said channel elements.

2. The mounting arrangement set forth in claim 1 including:

a screw received through said mounting device base and said flange for making said device flange fast to said studding.

* * * * *